United States Patent [19]

Larson et al.

[11] Patent Number: 4,973,443
[45] Date of Patent: Nov. 27, 1990

[54] SYSTEM FOR REMOVING AND INSTALLING A CONTROL ROD DRIVE

[75] Inventors: Richard C. Larson, Lake Zurich; Keith R. Spencer, West Miltmore, both of Ill.; Don P. Alercia, Monroeville, Pa.; Horst Kwech, Lake Bluff, Ill.; Thomas J. Litka, Chicago; Guy J. Ford, Apollo, Pa.

[73] Assignee: Westinghouse Electric Corp., Pittsburgh, Pa.

[21] Appl. No.: 262,994

[22] Filed: Oct. 26, 1988

[51] Int. Cl.$^5$ .................... G21C 71/12; G21C 19/20
[52] U.S. Cl. ................................................. 376/260
[58] Field of Search .............................. 376/260, 245

[56] References Cited

U.S. PATENT DOCUMENTS

| | | |
|---|---|---|
| 4,158,600 | 6/1979 | Akimoto et al. . |
| 4,288,290 | 9/1981 | Saima et al. ................... 376/260 |
| 4,292,133 | 9/1981 | Sasaki et al. .................. 376/260 |
| 4,518,559 | 5/1985 | Fischer et al. . |
| 4,585,612 | 4/1986 | Coussau et al. . |
| 4,639,994 | 2/1987 | Cooper, Jr. et al. ........... 376/260 |
| 4,650,639 | 3/1987 | Coussau ......................... 376/260 |

FOREIGN PATENT DOCUMENTS

| | | |
|---|---|---|
| 2842756 | 4/1979 | Fed. Rep. of Germany . |
| 51-46695 | 4/1976 | Japan . |
| 52-29596 | 3/1977 | Japan . |
| 52-44393 | 4/1977 | Japan . |
| 53-13096 | 2/1978 | Japan . |
| 53-122092 | 10/1978 | Japan . |
| 54-13898 | 2/1979 | Japan . |
| 54-35593 | 3/1979 | Japan . |
| 54-38495 | 3/1979 | Japan . |
| 54-121391 | 9/1979 | Japan . |
| 54-125393 | 9/1979 | Japan . |
| 54-134288 | 10/1979 | Japan . |
| 54-145893 | 11/1979 | Japan . |
| 59-84195 | 5/1984 | Japan . |
| 59-164993 | 9/1984 | Japan . |
| 59-170794 | 9/1984 | Japan . |
| 59-192994 | 11/1984 | Japan . |
| 60-21492 | 2/1985 | Japan . |
| 60-97297 | 5/1985 | Japan . |
| 61-116689 | 6/1986 | Japan . |
| 61-31839 | 7/1986 | Japan . |
| 61-33158 | 7/1986 | Japan . |
| 61-36635 | 8/1986 | Japan . |
| 61-42839 | 9/1986 | Japan . |
| 61-239195 | 10/1986 | Japan . |
| 61-272695 | 12/1986 | Japan . |
| 61-286796 | 12/1986 | Japan . |
| 61-294396 | 12/1986 | Japan . |
| 0392789 | 8/1976 | U.S.S.R. . |
| 1433462 | 4/1976 | United Kingdom . |

OTHER PUBLICATIONS

Document Entitled "Proposal to GPU Nuclear, Oyster Creek Nuclear Generating Station, For a Control Rod Drive Handling System (Inquiry No. 1268)", 9/87.

Primary Examiner—Daniel D. Wasil

[57] ABSTRACT

A system for removing and installing a control rod drive from a drive housing mounted in the vessel of a boiling water reactor. The system comprises a carriage supported by and movable along the service rails normally present in the undervessel cavity, and a cradle pivotally connected to the carriage and having a length substantially less than the length of a control rod drive. The pivot point between the cradle and the carriage is chosen such that the length of the carriage is subsumed within the length of the cradle when the cradle is pivoted into a horizontal position. The pivoting movement is accomplished by means of a hydraulic cylinder connected between one end of the carriage, and the upwardly-swinging end of the cradle. The cradle includes a lifting and lowering mechanism formed by the combination of a leadscrew drive and a hydraulic cylinder. The hydraulic cylinder is slidably connected to the cradle so that it is movable between a recess within the cradle when not in use to a position directly beneath and in tandem with the control rod drive when in use. The lifting and lowering mechanism can move a control rod drive from a position coterminous with the bottom end of the carriage to an installed position within a drive housing without the need for installation of special end effectors or other components onto the system.

22 Claims, 5 Drawing Sheets

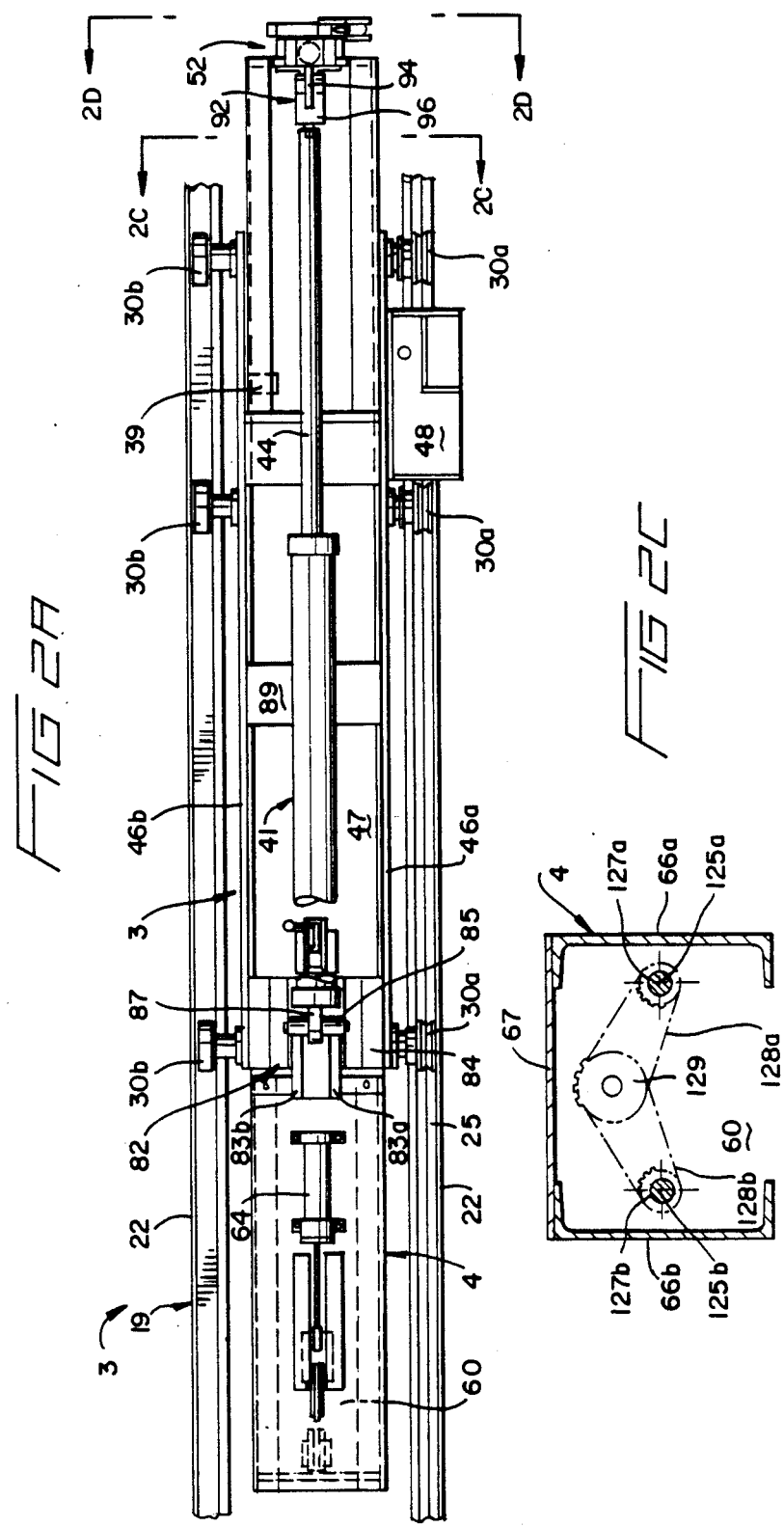

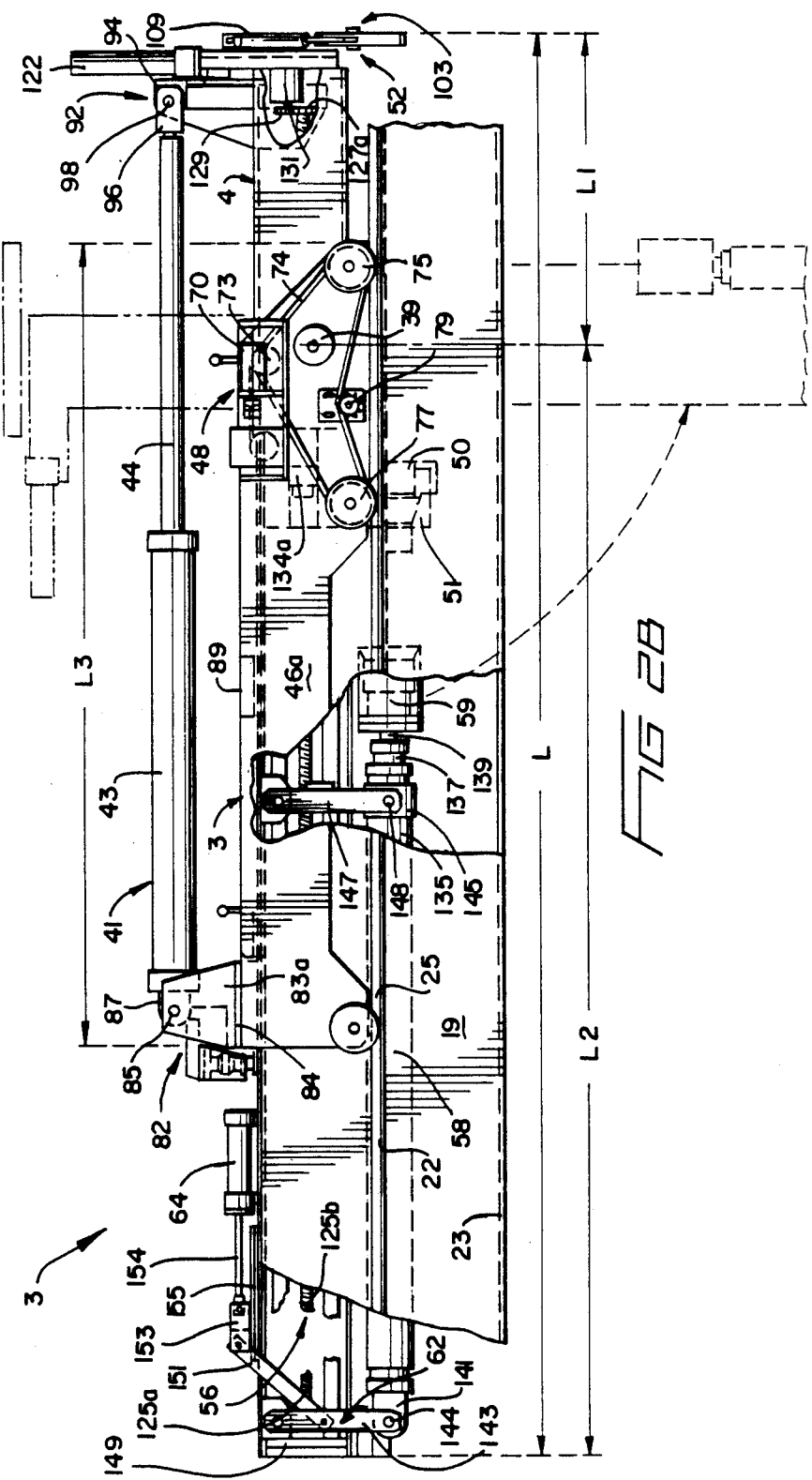

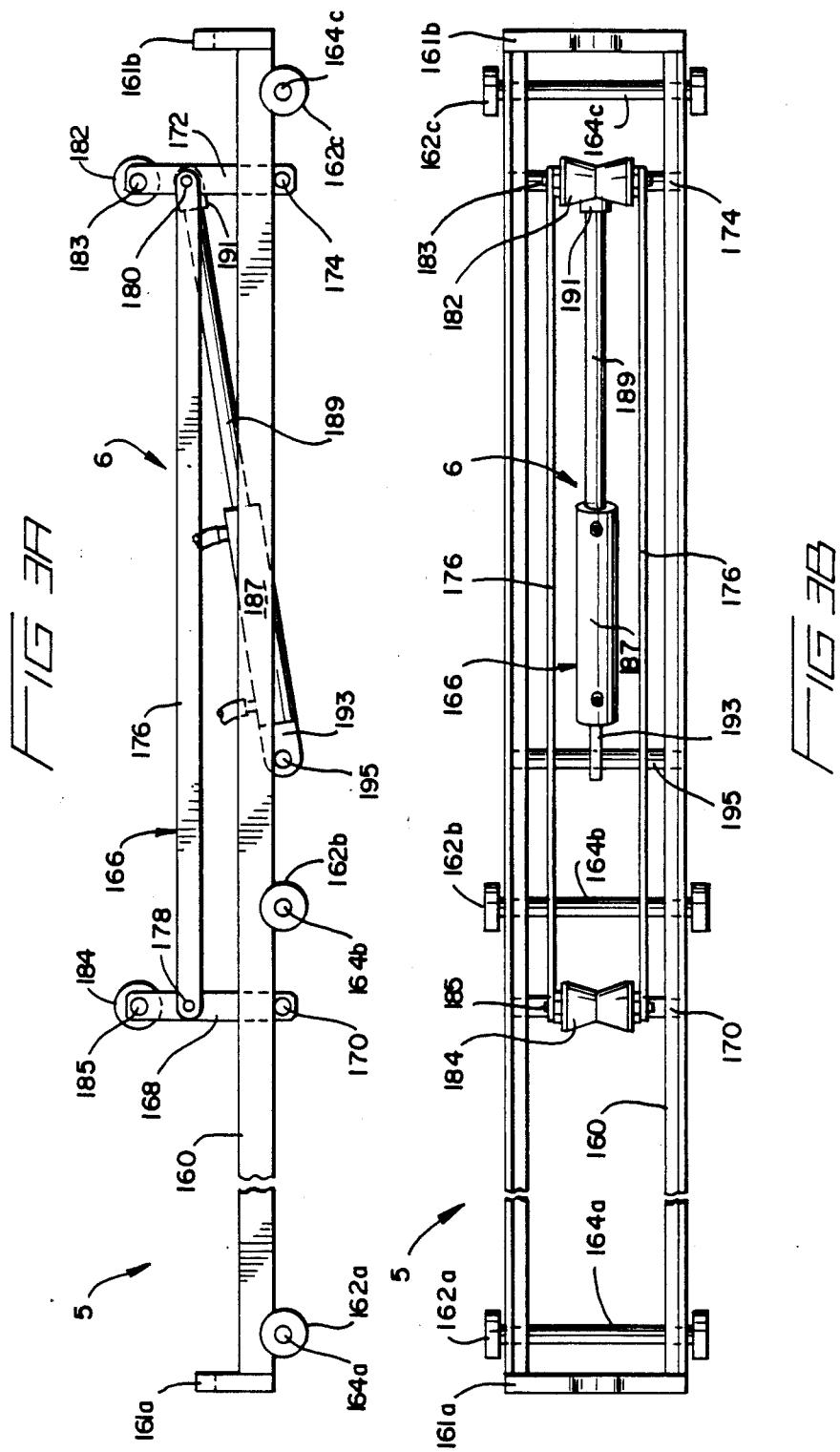

SYSTEM FOR REMOVING AND INSTALLING A CONTROL ROD DRIVE

BACKGROUND OF THE INVENTION

This invention generally relates to tooling for removing and installing a control rod drive from the drive housing mounted in the vessel of a boiling water reactor, and is specifically concerned with a compact and lightweight installation and removal assembly capable of expeditiously and remotely performing a control rod drive installation and removal operation without the necessity of providing special support structures in the undervessel cavity.

Tooling systems and methods for removing and installing the control rod drives from the drive housings of boiling water reactors are known in the prior art. Some of these tooling systems include a truck or carriage to which a beam is pivotally mounted. When the beam is swung into a horizontal position, the combination of the carriage and beam can be rolled along the service rails normally present in the undervessel cavity located beneath the reactor vessel. The beam is provided with a bucket for capturing an end of a control rod drive assembly, as well as a lifting and lowering mechanism for moving this bucket up or down when the beam is in a vertical position beneath a control drive housing. Examples of such tooling systems are disclosed in U.S. Pat. Nos. 4,288,290, 4,292,133, and Japanese patent No. 29,596.

While pivoting-beam type tooling systems have met with some success in installing and removing the control drive rods of boiling water reactors, the applicants have observed that each of these prior art systems has a number of operational shortcomings. However, before these shortcomings can be appreciated, some background as to the environment where these tooling systems are used is necessary.

Boiling water reactors generally include a cylindrically shaped reactor vessel which is supported over a cylindrically-shaped concrete room called the undervessel cavity in the art. Extending down from the bottom of the reactor vessel is an array of tube-like housings for housing the control rod drives that slide control rods up and down within the fuel assemblies disposed within the reactor vessel in order to control the fission reaction which occurs therein. Over a period of time (which is typically approximately four years) the bushings and seals of the control rod drives begin to wear out, thereby necessitating their replacement. The principle purpose of the undervessel cavity disposed beneath the reactor vessel is to provide access to the control rod drives and other reactor components extending downwardly from the bottom of the reactor vessel so that they may be serviced. Such undervessel cavities are typically provided with a pair of service rails which allow maintenance equipment to be easily shuttled across the diameter of the cylindrically-shaped undervessel cavity. To allow such maintenance equipment to be positioned at any given point under the reactor vessel, the ends of these service rails include wheels which engage a circular track that circumscribes the inner wall of the undervessel cavity. Hence a maintenance device may be moved in a polar-coordinate fashion under the reactor vessel by traversing the device to a selected point along the service rails and by rotating these service rails from zero to 360 degrees until the device is disposed under the housing of a selected control rod drive or other component.

Unfortunately, the undervessel cavity provides very little clearance for the entrance and operation of control rod drive installation and removal systems. While the bottom ends of the housings for the control rod drives are almost seven feet from the top of the service rails, the actual useable clearance is often only about four feet above the service rails due to the large number of delicate instrument tubes which extend from the bottom of the reactor vessel, and further due to the "forest" of electrical cables used to power the control monitors and control rod drives which drape down from the bottom of the vessel.

The applicants have noted that the tooling systems developed thus far for the removal and installation of such control rod drives suffer from a number of deficiencies which could bear improvement. These systems must be manually wheeled out onto the service rails, thus exposing workers to the "shine" of radiation emitted by the reactor vessel. Some of these systems use chain and sprocket drive mechanisms for elevating the control rod drives into position which can damage or completely cut through any of the maze of instrumentation tubes and electrical cables which hang down from the bottom of the reactor vessel. The operation of such tooling systems must be very carefully monitored by maintenance personnel standing in the immediate proximity to insure that none of the moving chains and sprockets damages any of the reactor components. The long chains such systems are further prone to stretching, which makes the automatic operation of these machines difficult as the number of sprocket turns necessary to elevate a particular control rod drive can vary. Others of these tooling systems are multi-component systems which include separate control rod elevating mechanisms or bolt removal assemblies that necessitate the installation of special tracks within the undervessel cavity. Some of these systems are considerably heavier than the existing service rails can carry, thereby necessitating replacing these rails. The installation of additional tracks and the replacement of the existing service rails again adds substantially to the time required to remove and replace worn control drive housings. Further, the pivotal stroke of the beams of these systems is very often larger than the clearance afforded within the undervessel cavity at a given drive housing, which necessitates manually moving the carriage of the device as the carrying beam is pivoted to avoid mechanical interference between the ends of the pivoting beam and one or more of the instrument tubes, electrical cables and other reactor components. Such manual positioning and repositioning of the carriage on the service rails greatly protracts the operational time required to either remove or install a control rod drive, which has the effect of requiring the maintenance personnel operating the system to spend substantial amounts of time in the radioactive undervessel cavity. Finally, the control rod drive lifting mechanisms associated with the pivoting beams provide no means for facilitating a rapid alignment between a control rod drive and a particular housing, and additionally are not completely reliable in operation. All of these are significant drawbacks that necessitate a great deal of manual labor in a highly radioactive environment.

Clearly, there is a need for a control rod drive installation and removal system that is sufficiently lightweight and compact in structure so that it may be used solely in conjunction with the service rails already provided in the undervessel cavity, and whose operational movements are short and directed either within or under the carriage of the system so as to avoid mechanical interference with the reactor components. Moreover, the system should be automatically and remotely operable, and the pivoting stroke of the beam of the tool should be short enough to eliminate or at least minimize the necessity for multiple movements of the carriage along the service rails whenever the support beam is pivoted. Ideally, such a system should further provide a self-contained lifting and lowering mechanism which is capable of moving a control rod drive from a position at the bottom end of the carriage to a position completely installed within a drive housing without the necessity of adding additional elevating mechanisms to the cradle. Finally such a system should have a means for facilitating the rapid alignment of the end of a control rod drive with the open end of a drive housing so as to expedite the operation of the system and to minimize the exposure of the system operators to potentially harmful radiation.

SUMMARY OF THE INVENTION

The invention is both a system and method for removing and installing a control rod drive which overcomes the shortcomings associated with the prior art and which may be substantially remotely and automatically operated. The system generally comprises a control rod drive installation and removal assembly including a carriage that is remotely and precisely movable to a specific location along the service rails disposed in the undervessel cavity of the reactor, and a cradle pivotally connected to the carriage and having a length less than the length of a control rod drive in order to minimize the possibility of mechanical interference between the installation and removal assembly and the drive housing, instrument tubes, and electrical cables hanging down from the bottom of the vessel. Moreover, the cradle includes a lifting and lowering mechanism which advantageously has a working stroke long enough to move the control rod drive from between a position where its bottom end is coterminous with the bottom end of the cradle, and a position where it is installed within a drive housing. The ability of the lifting and lowering mechanism to support and extend the control drive well beyond the upper end of the cradle greatly expedites the operation of the assembly by obviating the need for positioning separate elevating tools under the control rod drive.

The carriage includes a plurality of pairs of wheels that rollingly engage the service rails, and a drive train including a precisely controllable and lightweight hydraulic motor coupled to a simple transmission formed from a driven sprocket, and two drive sprockets connected to two of the carriage wheels. In the preferred embodiment, the two, forward most carriage wheels that engage an angle iron projecting from the track of the service rails are driven by the hydraulic motor to assure a positive traction at all times between the carriage and the service rails.

The lifting and lowering mechanism of the cradle includes a leadscrew drive assembly for moving a control rod drive from a position within the cradle to a position coterminous with the top end of the cradle, and a hydraulic cylinder for moving the control rod drive beyond the top end of the cradle to an installed position within a drive housing. To prevent the leadscrew drive assembly and the hydraulic cylinder from mechanically interfering with one another, the hydraulic cylinder is slidably connected to the cradle so that it is movable between a recess within the cradle when not in use, to a position directly beneath and in tandem with the control rod drive when in use. In the preferred embodiment, the slidable connection is effected by means of a toggle linkage actuated by means of a kick-out cylinder.

The cradle further includes a securing mechanism for detachably securing a control rod drive to its underside. In the preferred embodiment, the securing assembly is formed from a retaining bracket capable of capturing one end of a control rod drive, and an extendable and retractable pair of jaws for capturing the control rod drive at another point. The jaws include rollers so that the control rod drive may freely slide through the jaws when the control rod drive is moved vertically by either the leadscrew drive assembly or the hydraulic cylinder of the lifting and lowering mechanism. Moreover, both the retaining bracket and the extendable and retractable jaws compliantly secure the control rod drive in order to assist the system operator in aligning an end of the control rod drive into a tubular drive housing. Finally, the retaining bracket includes an opening to allow the piston rod of the hydraulic cylinder of the lifting and lowering mechanism to extend through the bracket and to lift the end of the control rod drive secured by the retaining bracket beyond the bracket and into an installed position within a drive housing.

The installation and removable assembly further comprises a pivot drive formed by a single hydraulic cylinder mounted between one end of the carriage and one end of the cradle for pivoting the cradle from a vertical to a horizontal position within the undervessel. In the preferred embodiment, the pivot joint between the carriage and the cradle is selected so that the end of the cradle which extends upwardly when the cradle is pivoted is well below the drive housings, instrument tubes and hydraulic power lines so as to avoid mechanical interference therewith. Moreover, the hydraulic cylinder of the pivot drive is connected between one end of the carriage and the relatively short end of the cradle that extends upwardly when the cradle is pivoted vertically. Such an arrangement advantageously allows the hydraulic cylinder to pivot the cradle by means of a relatively short horizontal stroke which is adjacent to the service rails in the undervessel in a position extremely unlikely to mechanically interfere with any of the components of the nuclear vessel. To further minimize any chance of such mechanical interference, the length of the carriage is rendered shorter than the length of the cradle, and the pivot point between the carriage and the cradle is selected so that the length of the carriage is entirely subsumed within the length of the cradle when the cradle is pivoted into a horizontal position Further adding to the compact dimensions and interference free operation of the assembly is the use of a transfer cart on the lower pair of tracks provided by the service rails in the undervessel cavity. The transfer cart used in the system of the invention includes a raising and lowering mechanism for raising and lowering a control rod drive onto the securing mechanism located on the underside of the cradle. The use of such a transfer cart on these lower tracks obviates the need for the construction and installation of additional rail structures in the undervessel.

In short, the system of the invention is capable of both removing and installing a control rod drive from a drive housing mounted in the vessel of a boiling water reactor by means of a single. rapidly-operated tool whose dimensions and operational movements minimize the possibility of mechanical interference with the surrounding reactor components. Moreover, these compact tool dimensions and operational movement eliminate or at least minimize the amount of positioning and repositioning the carriage of the tool must make on the service rails when installing or removing selected control rod drives, which further expedites the overall operation of the tool. These features, in combination with the compliant manner in which the securing means secures the control rod drive as it is lifted by the lifting and lowering mechanism, help to render the system largely remotely controllable, which in turn minimizes the amount of time the maintenance personnel must spend in the radioactive undervessel cavity.

BRIEF DESCRIPTION OF THE SEVERAL FIGURES

FIG. 2A is a top plan view of the installation and removal assembly of the invention;

FIG. 2B is a side view of the installation and removal assembly illustrated in FIG. 2A;

FIG. 2D is an end view of the installation and removal assembly illustrated in FIG. 2A along the line 2D—2D;

FIG. 3A is a side view of the modified transfer cart used in the system of the invention, and FIG. 3B is a top view of the transfer cart illustrated in FIG. 3A.

DETAILED DESCRIPTION OF THE PREFERRED EMBODIMENT

General Overview of the Structure and Operation of the Invention

Figure 1:
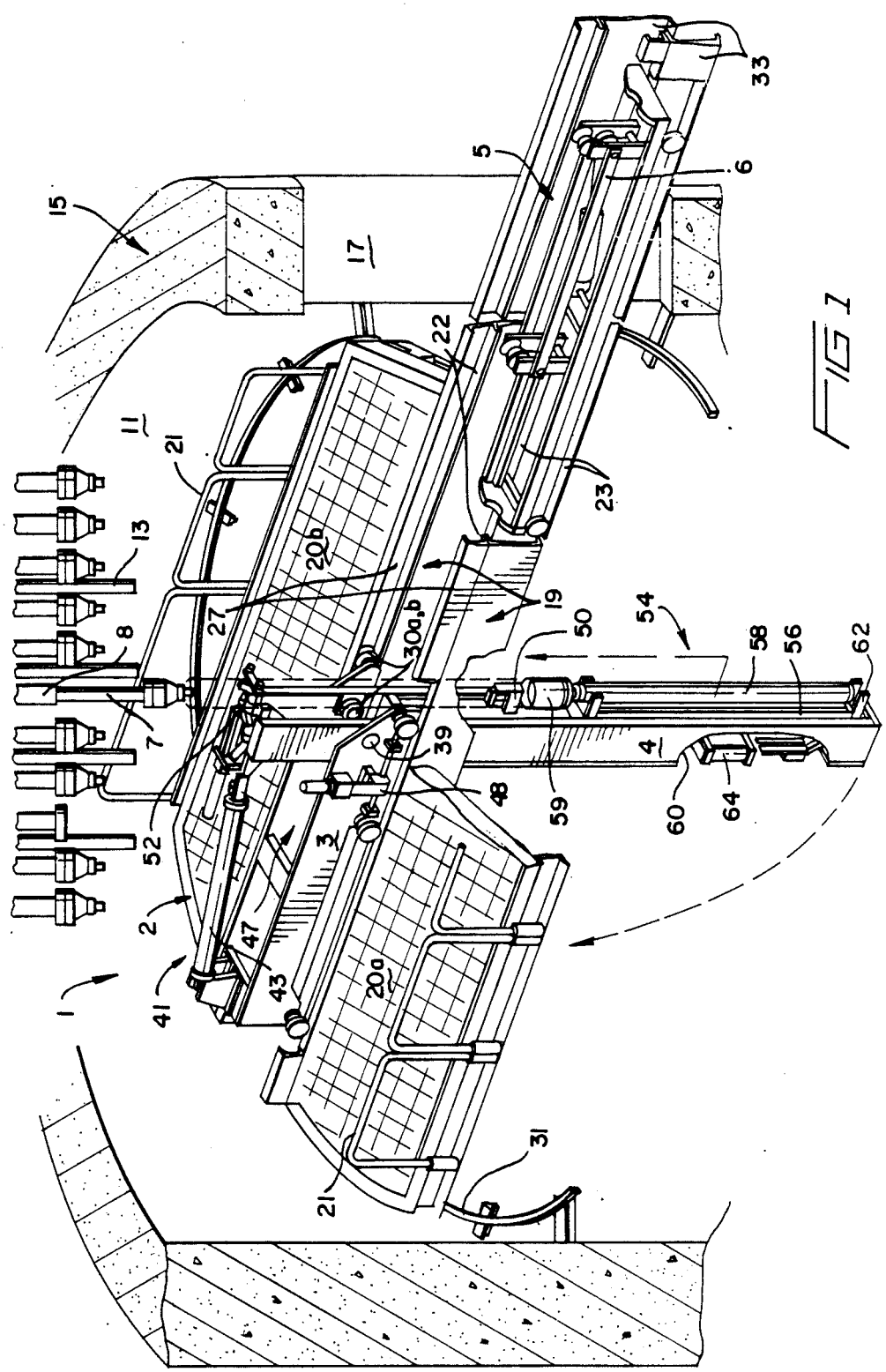
FIG. 1 is a perspective view of the control rod drive installation and removal system of the invention, illustrating both the installation and removal assembly and modified transfer cart on the service rails disposed in the undervessel cavity.

With reference to FIG. 1, wherein like numerals designate like components throughout all these several Figures, the control rod drive removal and installation system 1 of the invention generally comprises an installation and removal assembly 2 that includes a carriage 3 movable along the service rails in the undervessel, a cradle 4 pivotally connected to the carriage 3, in combination with a modified transfer cart 5 which is likewise movable along these service rails. The transfer cart 5 advantageously includes a raising and lowering mechanism 6 for raising and lowering control rod drives from the underside of the cradle 4 when this cradle is pivoted into the horizontal position illustrated in FIG. 2B. The principal purpose of the system 1 is to remove and install a control rod drive 7 from the tubular drive housings 9 extending down from the bottom of the reactor vessel (not shown) of a boiling water reactor (BWR). These control rod drives 7 extend down into the top portion of the undervessel cavity 11 between an array of pipe-like instrument tubes 13 and a "forest" of electrical cables (not shown). The sides of the undervessel cavity 11 are defined by a cylindrical wall structure 15 having an access way 17. A pair of service rails 19 traverses the diameter of the cylindrical wall structure 15 defining the undervessel cavity 11. These service rails 19 are flanked by service platforms 20a, 20b having guardrails 21 which provide maintenance personnel with a surface to stand upon when manipulating the carriage 3 or the transfer cart 5 of the system 1.

The service rails 19 are formed from a pair of parallel channel beams whose upper and lower flanges define upper tracks 22 and lower tracks 23. As may best to seen with respect to FIG. 2C, an inverted angle iron 25 is welded along one of the upper tracks 22. Additionally, a guide rail 27 having a capturing flange 29 is welded over the upper track defined by the angle iron 25. The combination of the upper V-shaped surface provided by the angle iron 25, and the capturing flange 29 of the guide rail 27 serves to secure the grooved wheels 30a of the carriage 3 to the upper tracks 22 so that there is no danger of the installation and removal assembly 2 from rolling off the upper tracks 22 during operation. The ends of the channel beams forming the service rails 19 are rollably mounted upon a circumferential rail 31 which completely surrounds the inner surface of the cylindrical wall structure 15. The circumferential rail 31 allows the service rails 19 to be rotated 360 degrees around the cylindrical wall structure 15 by means of an electrically-operated drive train (not shown). The 360 degree movement afforded by the rail 31, in combination with the radial movement afforded by the service rails 19, allows the carriage 3 and the modified transfer cart 5 to be moved into virtually any selected point under the reactor vessel in polar-coordinate fashion. To guide both the carriage 3 of the installation and removal assembly 2 and the transfer cart 5 onto the service rails 19, transition rails 33 are provided through at least one of the access ways 17 leading into the cylindrical wall structure 15. While the cylindrical wall structure 15 is not drawn entirely to scale in FIG. 1, it can still be appreciated that there is very little diametral or vertical clearance afforded within the undervessel cavity 11.

With specific reference now to FIGS. 1, 2A and 2B, the cradle 4 of the installation and removal assembly 2 is connected to the carriage 3 by means of a pivot joint 39. The cradle 4 is pivotable from the vertical position illustrated in FIG. 1 to the horizontal position illustrated in FIG. 2B by means of pivot drive 41, which includes a single hydraulic cylinder 43. In the preferred embodiment, hydraulic cylinder 43 is a single action cylinder having a three and one half inch bore and a piston rod that is approximately two inches in diameter and having a forty inch stroke. Such a cylinder 43 is available from Hydra-Dynamics Corporation located in Kenilworth, Ill. As is best seen in FIG. 1, the hydraulic cylinder 43 is connected between the back end of the carriage 3 and the upper end of the cradle 4. Such connection points allow the hydraulic cylinder 43 to exploit the small amount of mechanical advantage that is provided in the length L1 of the cradle 4 disposed between the pivot joint 39 and the upper end of the cradle 4 (see FIG. 2B). To render the installation and removal assembly 2 as compact as possible, the carriage 3 is formed from a pair of side panels 46a,b which define a hollow, rectangular interior 60 that is complementary in shape to the cradle 4, and which allows the cradle 4 to be folded completely within the cradle interior 60 when it is disposed in the horizontal position illustrated in FIG. 2B. A drive train 48 rotates the wheels 30a,b along the upper track 22. As will be discussed in detail later, the drive train incorporates a hydraulic motor which precisely positions the cradle 3 at a selected point along the service rails 19.

The cradle 4 includes, on its underside, a retaining bracket 50 capable of capturing and retaining the conical end of a control rod drive 7. The retaining bracket 50 contains a centrally disposed opening 51 for a purpose which will be described later. The cradle 4 further includes an extendable and retractable jaw assembly 52 capable of selectively capturing the tubular body of a control rod drive. As will become more evident hereinafter, the jaws of the jaw assembly 52 do not clampingly grasp the body of the control rod drive; they merely circumscribe the drive 7 so that it may be freely and slidably moved upwardly and downwardly by the lifting and lowering mechanism 54 also included within the cradle 4. Together, the retaining bracket 50 and the extendable and retractable jaw assembly 52 provide a two point securing means for securing a control rod drive 7 during a lifting or lowering operation. The grasp of the jaw assembly 52 is further designed to be compliant to facilitate alignment between a control rod drive 7 and a drive housing 8.

The lifting and lowering mechanism 54 contained within the cradle 4 consist of two components, including a lead screw drive assembly 56 which is threadedly engaged to the retaining bracket 50 and a two stage hydraulic cylinder 58 having a retaining cup 59 at its distal end for capturing the conical end of a control rod drive 7. As will be described in more detail hereinafter, lead screw drive assembly 56 is formed from a pair of parallel, threaded rods rotatably mounted within the cradle 37 and powered by a hydraulic motor. The clockwise or counterclockwise rotation of the parallel lead screws of the lead screw drive assembly 56 moves the retaining bracket 50 between the top and bottom ends of the cradle 4. However, as a control rod drive 7 must be lifted considerably beyond the upper end of the cradle 4 in order to become installed within a drive housing 8, the two stage hydraulic cylinder 58 is provided. This cylinder 58 is movable from a position within the cradle interior 60 to a position directly beneath the retaining bracket 50 when the bracket 50 is moved to the top end of the cradle 4 (as is shown in FIG. 1) by means of the combination of a toggle linkage 62 which is swung from an inner to an outer position by means of a hydraulic kickout cylinder 64. When the two stage hydraulic cylinder 58 is disposed beneath the retaining bracket 50 as is shown in FIG. 1, the retaining cup 59 may freely extend through the opening 51 in the retaining bracket 50 to complete the lifting of a control rod drive 7 into an installed position within a drive housing 8 (as is indicated in phantom in FIG. 1).

With reference again to FIG. 2B, the length L of the cradle 4 is deliberately made to be approximately twelve feet, which is about three feet shorter than the fifteen foot length of a control rod drive 7. Such a shorter length advantageously reduces the overall length of the assembly 1, thereby rendering it more compact and more easily maneuverable through the cavity access ways 17 and into the undervessel cavity 11 itself. The shorter length also advantageously reduces the overall weight of the assembly 1. Further complementing this design feature is the fact that the length L3 of the carriage 3 is considerably shorter than the length L of the cradle 4, and that the pivot joint 39 is located along the longitudinal axis of the cradle 4 at a point that the entire length L3 of the carriage will be subsumed within the length L of the cradle when the cradle 4 is positioned horizontally. A final dimensioning feature which advantageously assists the assembly 1 in performing its operation without mechanical interference and without the necessity for constantly repositioning the carriage 3 when the cradle 4 is pivoted upwardly results from the fact that the pivot joint 39 is located along the longitudinal axis of the cradle 4 at a point which allows only a short upper length L1 to extend upwardly toward the instrument tubes 13 and hydraulic lines (no shown) when the cradle 4 is pivoted into the vertical position illustrated in FIG. 1. Such proportioning has the undesirable effect of creating a mechanical disadvantage in the pivoting movement of the cradle 4 which requires a considerable amount of drive force from the pivot drive 41, as the upward length L1 of the cradle 4 is considerably smaller than its downward length L2. However, this mechanical disadvantage is overcome by the use of the previously described hydraulic cylinder 43, which is not only amply powerful enough to reliably and smoothly effect the pivoting motion, but which further is capable of producing the required power with only a minimal weight addition to the overall assembly 1. Moreover, because of the aforementioned mechanical disadvantage which occurs as a result of the fact that L1 is much smaller than L2, the cylinder 43 need only provide a relatively short stroke in order to effect the desired pivoting movement. The proximity of the cylinder 43 to the carriage 2, coupled with the relatively short, horizontal stroke that it provides to effect the desired 90 degree pivoting motion, helps to provide a tooling system 1 with short linear dimensions and compact operational strokes and movements which helps to avoid mechanical interference between the assembly 2 and the control rod drives 7, low-hanging instrument tubes 13 and electrical cables extending down from the bottom of the reactor vessel.

Specific Description of the Structure and Operation of the Invention

With reference again to FIGS. 2A and 2B, the drive train assembly 48 of the carriage 3 includes a hydraulic motor 70 whose output shaft is coupled to a drive sprocket 73. The use of a hydraulic motor to power the drive train assembly 48 is preferred for two reasons. First, the rpm output of such a hydraulic motor may be easily and accurately controlled by merely monitoring the volume of pressurized fluid conducted through it, which in turn allows the maintenance personnel to remotely move the cradle 3 to a precise point along the longitudinal axis of the service rails 19. Secondly, unlike electrical motors, hydraulic motors are uneffected by the water which often splashes down from the drive housings 8 when the worn out control drives 7 are removed for servicing. In the preferred embodiment, a Char-lynn hydraulic motor manufactured by the Eaton Fluid Power Division of Eaton Corporation located in Eden Prarie, Minn., is used to power the drive train assembly 48. The previously mentioned drive sprocket 73 is engaged to driven sprockets 75 and 77 connected to the two, forward-most wheels 30a of the carriage 3. The engagement of the drive chain 74 to two of the grooved wheels 30a ensures that, at all times, a positive traction will exist between the carriage wheels 30b and the angle iron 25 protruding up from one of the upper tracks 22. Such positive traction allows the equipment operator to determine the precise position of the assembly 2 along the service rails 19 by monitoring the number of turns of the output shaft of the motor 70. The driven sprockets 75 and 77 are larger than the drive sprocket 73 to provide a three to one drive ratio. An idler gear 79 is provided in order to adjust the tautness of the drive chain 74.

Figure 2C:
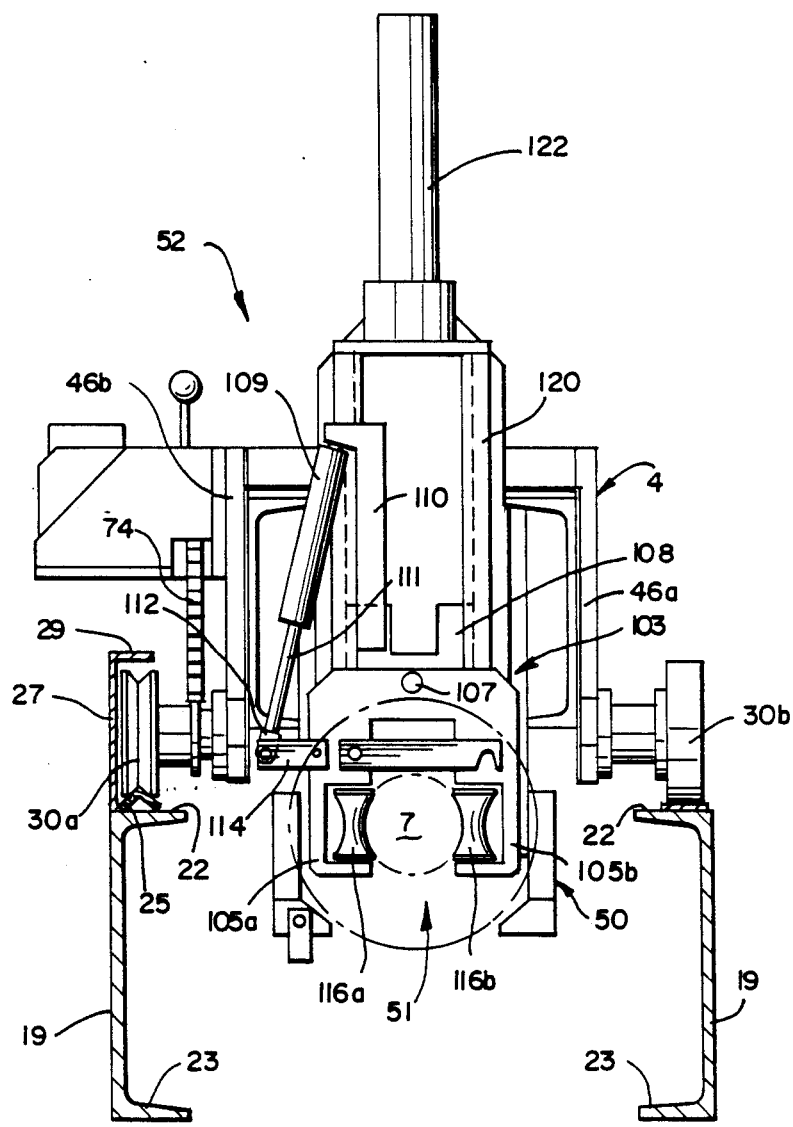
FIG. 2C is a cross sectional view of the cradle of the system along the line 2C—2C in FIG. 2A.

With reference to FIGS. 2A, 2B and 2C, the cradle 4 is formed from a pair of aluminum channel beams 66a, 66b tied together along their top sides by a reinforcing plate 67. The interior 60 defined by the opposing beams 66a, 66b contains both the lead screw drive assembly 56 and the two stage hydraulic cylinder 58 of the lifting and lowering mechanism 54.

The back end of the cradle 4 further includes a rear pivot bracket 82 comprised of a pair of parallel bracket plates 83a and 83b whose bottom edges are integrally connected to a reinforcing plate 84 which in turn is welded to the side panels 46a and 46b of the carriage 3. A yoke-type pivot pin 85 extending through bores in the bracket plates 83a, 83b links these plates to the rear lug 87 of the pivot cylinder 43. This reinforcing plate 84, along with spacer rib 89 (located near the middle of the carriage 3) secures the two side panels 46a and 46b together in a parallel relationship while still leaving a rectangular space 47 within the carriage 3 which the cradle 4 may be received into when the cradle 4 assumes a horizontal position.

The front end of the cradle 4 includes a front pivot bracket 92 formed from a mounting lug 94 which is connected at its bottom portion to the top or front end of the cradle 4 and at its top portion to a piston rod clevis 96 by means of another yoke-type pivot pin 98. As is evident in FIG. 2B. the rear pivot bracket 82 and the front pivot bracket 92 mount the hydraulic cylinder 43 of the pivot drive 41 in a close parallel relationship with respect to the cradle 4 and service rails 19. Such a configuration helps to localize all mechanical motions close to the body of the installation and removal assembly 3, and away from reactor components which could possibly interfere with the pivoting cradle 4. Moreover, making both of the brackets 82 and 92 approximately the same height with respect to the carriage 3 helps to minimize moment forces on the piston rod 44 when the cradle 4 is folded within the carriage 3 as shown in FIG. 2B by directing the load applied to the rod 44 into a load whose components are exclusively compressive in nature.

With reference now to FIGS. 2B and 2C, the extendable and retractable jaw assembly 52 is located just in front of the previously described front pivot bracket 92. The purpose of this component is to detachably secure the tubular body of a control rod drive in such a way that it is easily slidable through the jaws along the longitudinal axis of the cradle 4. To this end, the jaw asembly 52 includes a jaw mechanism 103 formed from a pair of opposing jaws 105a and 105b pivotally linked together in "scissors" fashion by a pin 107 to a sliding member 108. A jaw-clamping, double-action hydraulic cylinder 109 is likewise connected to the slide member 108 by means of bracket 110. The clamping cylinder 109 has a reciprocable piston rod 111 linked to a clevis 112 which in turn is connected to a bracket 114 coupled to jaw 105a. In operation, the extension or retraction of the piston rod 111 causes jaw 105a to pivot toward or away from the jaw 105b. To permit a control rod drive 7 to slidably move along the axis of the cradle 4 through the jaw mechanism 103, each of the of the jaws 105a and 105b is provided with a roller 116a and 116b to permit the entire jaw mechanism 10 to be retracted from the positions illustrated in FIGS. 2B and 2C to a position where the mechanism 103 does not extend beneath the cradle 4, the slide member 108 is in turn connected to the piston (not shown) of a double action extension and retraction cylinder 122. The retracting movement afforded by the cylinder 122 allows the jaws 105a and 105b to be released from the body of a control rod drive 7 so that the rod retaining cup 59 located on the distal end of the piston rod of cylinder 58 will not come into contact with the jaw mechanism 103 when the cup 59 extends upwardly to lift a control rod drive 7 into an installed position in a drive housing 8. The extendable and retractable assembly 52, in combination with the retaining bracket 50 located on the underside of the carriage 4, provide a securing mechanism that secures a control rod drive 7 at two separate points along its longitudinal axis. In operation, the pressure of the hydraulic fluid used to power the hydraulic cylinders 109 and 122 is maintained at a level great enough to grippingly secure a control rod drive 7, but low enough to afford some compliance in this grip so that, when the control rod drive 7 is lifted up toward a drive housing 8, a maintenance worker can easily manipulate the distal end of the drive 7 into the open end of the housing 8.

As is best seen in FIGS. 2B, and 2C, the lead screw drive assembly 56 of the lifting and lowering mechanism 54 includes a pair of parallel lead screws 125a and 126b that are rotatably mounted at their back and front ends within the cradle 4. Each of the front ends of the lead screw 125a and 125b terminates in a driven sprocket 127a and 127b respectively. These driven sprockets 127a and 127b are in turn driven via a drive chains 128a,128b which mesh with the drive sprocket 129. Drive sprocket 129 is in turn connected to the output shaft of a hydraulic motor 131 of the same type as the hydraulic motor used to power the carriage drive train 48. The interface between the retaining bracket 50 of the securing means and the lifting and lowering mechanism 54 occurs at lead screw adaptor 133. This adaptor 133 includes two parallel ball nuts 134a,134b (only one of which is shown) which ride independently upon threaded rods. Hence when the hydraulic motor 131 turns the drive sprocket 129 that rotates the lead screws 125a and 125b, the lead screw adaptor 133 will move the retaining bracket 50 either toward the back or the front end of the cradle 4. The use of a lead screw drive assembly 56 in the lifting and lowering mechanism 54 of the system 1 is advantageous for two reasons. First, such a lead screw-type mechanism allows the maintenance personnel to precisely and remotely control the position of the retaining bracket 50 along the longitudinal axis of the carriage 4 by merely monitoring the number of rotations that the hydraulic motor 131 turns the lead screws 125a and 125b. Secondly, it is mechanically reliable and not apt to breakage. Thirdly, because either of the lead screws 125a or 125b is strong enough to carry a control rod drive 7 by itself, and because the ball nuts of the adaptor 133 are not interconnected with one another, there is no danger of failure or collapse of the bracket 50 in the unlikely event that one of the lead screws 125a or 125b should break or otherwise fail. Instead, the remaining lead screw and ball nut would be capable to afford a controlled movement of the bracket 50 until appropriate repairs could be made.

Turning next to the two stage hydraulic cylinder 58 which forms the second component of the lifting and lowering mechanism 54, this cylinder 58 includes a first cylinder 135 having a second cylinder 137 telescopically mounted therein. The second cylinder 137 in turn contains a piston rod 139. The long stroke afforded by the use of a two stage, hydraulic cylinder 58 allows it to move a control rod drive from a position substantially coterminous with the front end of the carriage 4 to an installed position within a drive housing 8 while at the same time allowing the entire cylinder 58 to be stored in the hollow interior 60 of the cradle 4 near its back portion when not in use.

The cylinder 58 includes a rear lug 141 which is linked to the rear, parallel members 143 of the previously mentioned toggle linkage 62 by means of pivot pin 144. The front end of the piston 58 includes a front mounting yoke 145 which is linked to the front parallel members 147 of the toggle linkage 62 by means of pin 148. The rear parallel members 143 of the toggle linkage 62 are connected to the previously mentioned kickout cylinder 64 (which is a double action hydraulic cylinder) by means of a yoke bracket 151 which is pivotally connected thereto at its distal end. The proximal end of yoke bracket 151 is pivotally connected to a clevis 153 coupled to the distal end of the piston rod 154 of the cylinder 64. This clevis 153 is slidably connected to a guide rail 155. In operation, the kickout cylinder 164 retracts the two stage cylinder 58 within the interior 60 of the cradle 4 by retracting the piston rod 154 so as to swing the rear parallel members 143 toward the front of the cradle 4. To extend the two stage cylinder 58 to a position just under the retaining bracket 50 (which is done after the retaining bracket 50 moves a control rod drive 7 into a coterminous position with respect to the top end of cradle 4) the piston rod 154 of the kickout cylinder 64 is extended into the position illustrated in FIG. 2B, which not only extends the linkage 62, but advantageously allows the compressive load born by the two stage cylinder 58 to be born by the reinforcing plate 149.

With reference now to FIGS. 3A and 3B, the transfer cart 5 of the system 1 includes a box-type frame 160 having front and rear cradle members 161a and 161b traversing its front and rear ends respectively. To uniformly distribute the load of a control rod drive laid across the cradle members 161a and 161b, three sets of wheels 162a, 162b and 162c are rotatably connected to axles 164a, 164b and 164c connected to the back, middle and front portions of the frame 160. Disposed throughout the middle portion of the cart frame 160 is a toggle or a parallelogram linkage 166. This linkage 166 is formed from rear parallel bars 168 pivotally connected to an axle 170, and front parallel bars 172 pivotally connected upon an axle 174. The parallel bars 168 and 172 are linked together by lateral parallel bars 176 by way of pins 178 and 180. A front and rear rollers 182 and 184 journalled upon shafts 183 and 185 are provided at the distal ends of the front and rear parallel bars 172 and 168, respectively. These rollers 182 and 184 facilitate movement of a control rod drive 7 to and from the front and rear cradle members 168a and 168b. A raising and lowering cylinder 187 is centrally mounted between the frame 160 and the toggle linkage 166 in order to raise and lower the rollers 182 and 184. This cylinder 187 includes a double action piston rod 189 that terminates in a clevis 191 pivotally mounted to the front parallel bars 182 as shown. This cylinder 187 further includes a rear lug member 193 that is in turn pivotally connected to shaft 195. When the piston rod 189 of the cylinder 187 is extended as is best seen in FIG. 3A, the rollers 182 and 184 are lifted into a raised position. Of course, these rollers 182 and 184 swing back into a position to the frame 160 when the piston rod 189 of the double action hydraulic cylinder 187 is retracted.

In operation, the installation and removal assembly 2 is rolled out onto the service rails 19 in the undervessel cavity 11 by means of a transition rail 33. At this juncture the cradle 4 is folded into the interior of the carriage 3 in the horizontal position illustrated in FIG. 2B. The maintenance personnel next determine the location of the control rod 7 that needs to be serviced. Once this location is determined, the hydraulic motor of the carriage drive train assembly 48 is actuated in order to turn the carriage wheels 30a, 30b sufficiently to place the assembly 2 at the proper radial position along the service rails 19. The service rails 19 are then rotated along the circumferential rail 31 in order to align the pivot joint 39 adjacent to the control rod drive 7 to be replaced. Next, the hydraulic fluid present within hydraulic cylinder 43 is slowly released in to allow the large bottom length L2 of the carriage 4 to swing down into a vertical position such as illustrated in FIG. 1. During this step, the hydraulic cylinder 43 advantageously acts as a shock absorber that smoothly and slowly allows the bottom length L2 of the carriage 4 to swing down as the short top length L1 swings upwardly in much the same way as the pneumatic door opener. The lead screw drive assembly 56 of the lifting and lowering mechanism 54 is then actuated to move the retaining bracket 50 all the way up to the distal end of the cradle 4. Next, the kickout cylinder 64 is actuated in order to swing the two stage hydraulic cylinder 58 from a position within he interior 60 of the cradle 4 to a position underneath the retaining bracket 50. Pressurized hydraulic fluid is then admitted to the two stage hydraulic cylinder 58 so that piston rod 139 lifts the retaining cup 59 up through the opening 51 within the bracket 50 and up into a position just under the conical end of a control rod drive 7 to be serviced. The bolts retaining the control rod 7 are then removed. The removal of the last one or two bolts acts to slowly lower the conical end of the control rod drive 7 into the retaining cup 59. The hydraulic cylinder 58 is next slowly relieved of the pressurized hydraulic fluid in its interior, which results in a retraction of the cup 59. As soon as the cup 59 is lowered under the extendible and retractible jaw assembly 52, jaw-clamping cylinder 109 is actuated to open the jaws 105a and 105b, extension and retraction cylinder 122 is actuated to extend the jaws 105a and 105b around the cylindrical body of the control rod drive 7, and jaw clamping cylinder 109 is actuated to pivot the jaws 105a,105b inwardly and around the control rod 7. As the cup 59 passes back through the opening 51 in the retaining bracket 50, the conical end of the rod drive 7 is captured within the bracket 50. After the piston rod 139 of the cylinder 58 has been allowed to completely retract, the cylinder 58 is pulled back within the interior 60 of the cradle 64 by actuating the kickout cylinder 64 to withdraw piston rod 154. The lead screw drive assembly 56 is then actuated again to move the bottom end of the control rod drive all the way to the bottom end of the cradle 40. Pressurized hydraulic fluid is then readmitted into the hydraulic cylinder 43 of the pivot drive 41, causing the cradle 4 to pivot back into the horizontal position illustrated in FIG. 2B, where upon transfer cart 5 is slid beneath the cradle 4 upon the lower tracks 23 of the service rails 19. Finally, the lifting mechanism 6 of the transfer cart is actuated to draw the rollers 182 and 184 into contact with the control rod drive 7 where upon the jaw clamping cylinder is actuated to release the jaws 105A and 105B from around the control rod drive 7, and the extension and retraction cylinder 122 is actuated to completely withdraw the jaw mechanism 103 from around the body of the drive 7. At the juncture, the motor of the lead screw drive assembly 56 may be actuated momentarily to make sure that the bracket 50 is completely withdrawn from the conical end of the control rod drive 7. The old control rod drive 7 is then wheeled out of the undervessel cavity 11 by the cart 5, where upon a new control rod drive 7 is placed onto the rollers 182 and 184. This new control rod drive is then wheeled beneath the carriage 4, and the process is repeated in reverse to install a new control rod drive 7 within a drive housing 8.

We claim:

1. A system for removing and installing an elongated control rod drive from a drive housing mounted in the vessel of a boiling water reactor of the type having an undervessel cavity with a pair of service rails, comprising:

a control rod drive installation and removal assembly including a carriage means supported by said service rails and having a length less than that of a control rod drive and a plurality of pairs of wheels that rollingly engage said service rails, wherein said carriage means includes a drive train engaged to at least two carriage wheels that is driven by a remotely operable hydraulic motor, a cradle means having a length substantially less than the length of a control rod drive and which is pivotally connected to the carriage means and movable between a vertical position and a horizontal position, wherein the length of the carriage means is subsumed within the length of the cradle means, a single hydraulic piston and cylinder means for pivotally moving said cradle means relative to said carriage means, and a lifting and lowering means disposed within the interior of said cradle means and adapted for moving a control rod drive between a position where one end of said control rod drive is substantially coterminous with the bottom end of said cradle means when said cradle means is vertically oriented, and a position where it is installed within said drive housing.

2. A system as defined in claim 1, wherein said hydraulic piston and cylinder means is connected between an end of said carriage means and an end of said cradle means.

3. A system as defined in claim 1, wherein said cradle means is pivotally connected to said carriage means at a point along its length so that the upper end of said cradle means pivots into a position substantially below said drive housing when said cradle means is vertically positioned, and wherein said hydraulic piston and cylinder means is connected between an end of said carriage means and the upper end of said cradle means.

4. A system as defined in claim 1, wherein said lifting and lowering means includes a first lifting mechanism for moving a control rod drive to a position substantially in tandem with said cradle means, and a second lifting for extending said control rod drive completely from said cradle means and into an installed within a drive housing.

5. A system as defined in claim 4, wherein said second lifting mechanism is movable into and out of said interior cradle means.

6. A system as defined in claim 1, wherein said hydraulic cylinder and piston means is disposed slightly above cradle means.

7. A system as defined in claim 1, wherein said service rails include a pair of upper tracks and a pair of lower tracks, and wherein said system further comprises a car movable along said lower tracks and underneath cradle means for receiving and delivering a rod drive upwardly through said upper tracks an the underside of said cradle means.

8. A system as defined in claim 7, wherein said cart means includes a means for raising and lowering a control rod drive to and from the underside of said cradle.

9. A system as defined in claim 1, wherein said cradle means includes a securing means for detachably securing a control rod drive delivered to its underside.

10. A system for removing and installing an elongated control rod drive from a drive housing mounted in the vessel of a boiling water reactor of the type having an undervessel cavity with a pair of parallel service rails, comprising:

a control rod drive installation and removal assembly including a carriage means supported by and movable along said service rails and having a length less than that of a control rod drive and a plurality of pairs of carriage wheels that engage the pair of service rails, and a drive train connected to at least two carriage wheels that engage the same service rail that includes a reversible hydraulic motor that is remotely operable, a cradle means pivotally movable with respect to the carriage means between a vertical and a horizontal position and having a length substantially less than that of a control rod drive but greater than the length of the carriage means, means for pivotally connecting said cradle means to said carriage means at a point along their respective lengths such that the upper end of the cradle means remains well below any reactor components when pivoted into a vertical position, and the length of the carriage means becomes subsumed within the length of the cradle means when the cradle means is pivoted into a horizontal position, and a hydraulic cylinder and piston means connected between said carriage means and said cradle means for pivotally moving said cradle means, and a lifting and lowering means in the interior of said cradle means and adapted for moving a control rod drive between a position where one end of the control rod drive is substantially coterminous with one end of the cradle means and a position where it is installed within said drive housing.

11. A system defined in claim 10, wherein said lifting and lowering means includes a first lifting mechanism for lifting the bottom end of the control rod drive when said drive is vertically disposed from a position substantially coterminous with the bottom and of the cradle means to a position substantially coterminous with the top end of the cradle means.

12. A system defined in claim 11, wherein said lifting and lowering means includes a second lifting mechanism for lifting the bottom end of said control rod drive from a position substantially coterminous with the top end of the cradle means to an installed position within drive housing.

13. A system defined in claim 11, wherein said cradle means includes a securing means for detachably securing a control rod drive to the underside of said cradle means, including a first retaining means for capturing one of the control rod drive, and the first lifting mechanism of the lifting and lowering means operates said first retaining means from a position proximal to said bottom end of said cradle means to a position proximal to the top end of said cradle means.

14. A system defined in claim 13, wherein said securing means includes a second retaining means for slidably mounting a second end of the control rod drive to the cradle means such that said control rod drive slidably moves through said second retaining means when said first lifting mechanism operates to move said first retaining means.

15. A system defined in claim 11, wherein the first lifting is a leadscrew drive assembly contained within the interior of said cradle means.

16. A system defined in claim 13, wherein the first retaining means is a retaining bracket having an opening, and the second lifting mechanism is a two stage hydraulic cylinder having a piston rod that is extendible through the opening of the retaining bracket of said first retaining means.

17. A system defined in claim 16, wherein said second lifting mechanism includes a toggle linkage means that supports said two stage hydraulic cylinder beneath said retaining bracket after said bracket has moved the bottom end of the control rod drive substantially proximal with the top end of said cradle means.

18. A system defined in claim 13, wherein said securing means compliantly mounts said control rod drive to said cradle means to facilitate alignment between a control rod drive and a drive housing.

19. A system for removing and installing an elongated control rod drive from a drive housing mounted in the vessel of a boiling water reactor of the type having an undervessel cavity with a pair of service rails one of which includes a tapered surface along its upper edge, comprising:

a control rod drive installation and removal assembly including a carriage means supported by and movable along service rails and having a length less than that of a control rod drive, and including a plurality of pairs of carriage wheels, at least two pairs of which include wheels having circumferential grooves that are complementary in shape to the tapered surface of said service rail to afford positive traction between said rail and said grooved wheels, and a drive train including a remotely operable and reversible hydraulic motor having a drive shaft that is coupled to both of said grooved wheels through a drive reduction mechanism that reduces each turn of the output shaft of the hydraulic motor to about one-third of a turn for each of the grooved carriage wheels, a cradle means having a length less than the length of a control rod drive but greater than the length of the carriage means and pivotally mounted onto the carriage means and movable between a vertical position and a horizontal position wherein the length of the carriage means is subsumed within the length of the cradle means, wherein said cradle means includes a securing means for detachably mounting a control rod drive to the cradle means, and a lifting and lowering means within the interior of the cradle means and operatively connected to the securing means and adapted for moving a control rod drive between a position where one of its ends is coterminous with one of the ends of the cradle means, and a position where it is installed within said drive housing.

20. A system defined in claim 19, wherein said securing means compliantly and detachably mounts a control rod drive to the cradle means to facilitate alignment between said control rod drive and a drive housing.

21. A system defined in claim 19, further comprising a hydraulic cylinder means connected between one end of the carriage means and one end of the cradle means for pivotally moving said cradle means.

22. A system defined in claim 19, wherein said lifting and lowering means includes a leadscrew drive assembly and a two stage hydraulic cylinder means.

* * * * *